United States Patent
Hamano et al.

(10) Patent No.: US 12,066,448 B2
(45) Date of Patent: Aug. 20, 2024

(54) SPECIMEN INSPECTION AUTOMATION SYSTEM AND SPECIMEN INSPECTION METHOD

(71) Applicant: Hitachi High-Tech Corporation, Tokyo (JP)

(72) Inventors: Satohiro Hamano, Tokyo (JP); Shigeru Yano, Tokyo (JP); Misato Fukami, Tokyo (JP); Ai Masuda, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 365 days.

(21) Appl. No.: 17/622,369

(22) PCT Filed: Mar. 11, 2020

(86) PCT No.: PCT/JP2020/010492
§ 371 (c)(1),
(2) Date: Dec. 23, 2021

(87) PCT Pub. No.: WO2021/014672
PCT Pub. Date: Jan. 28, 2021

(65) Prior Publication Data
US 2022/0244280 A1   Aug. 4, 2022

(30) Foreign Application Priority Data
Jul. 22, 2019  (JP) ................. 2019-134331

(51) Int. Cl.
*G01N 35/00* (2006.01)
(52) U.S. Cl.
CPC ........... *G01N 35/0095* (2013.01); *G01N 2035/00495* (2013.01); *G01N 2035/0091* (2013.01); *G01N 2035/0096* (2013.01)
(58) Field of Classification Search
None
See application file for complete search history.

(56) References Cited

U.S. PATENT DOCUMENTS

| 6,793,887 B2 * | 9/2004 | Itoh ..................... G01N 1/28 422/63 |
| 8,484,111 B2 * | 7/2013 | Frankland ........... G06Q 10/06 705/28 |

(Continued)

FOREIGN PATENT DOCUMENTS

| CN | 110333361 A * 10/2019 ............. G01N 35/00 |
| JP | 10-90276 A 4/1998 |

(Continued)

OTHER PUBLICATIONS

International Search Report of PCT/JP2020/010492 dated May 12, 2020.

(Continued)

*Primary Examiner* — Peter J Macchiarolo
*Assistant Examiner* — Jermaine L Jenkins
(74) *Attorney, Agent, or Firm* — MATTINGLY & MALUR, PC

(57) ABSTRACT

An inspection result of a specimen inspection automation system can be reported within a prescribed time, even if a large number of urgent specimens have been input. An instruction reception unit receives turn around time (TAT) information and a discharge instruction. The necessity of discharging a specimen for which the instruction was issued with the discharge instruction is determined and a discharge instruction unit creates a discharge destination and a conveyance route to the discharge destination for the specimen. A discharge mechanism discharges the specimen for which the instruction was issued. Even for a specimen which is caused to wait for processing due to the occurrence of specimen congestion and for which there is a risk of an inspection result reporting delay, an inspection result can be reported within a prescribed time by switching from auto- (Continued)

matic processing by the system to manual processing by an operator.

11 Claims, 9 Drawing Sheets

(56) References Cited

U.S. PATENT DOCUMENTS

| | | | | |
|---|---|---|---|---|
| 10,768,187 | B2* | 9/2020 | Yasuzawa | G01N 35/00 |
| 11,209,450 | B2* | 12/2021 | Kinugawa | G01N 35/021 |
| 11,360,110 | B2* | 6/2022 | Yamaguchi | G01N 35/04 |
| 2010/0250174 | A1 | 9/2010 | Tokunaga et al. | |
| 2013/0117042 | A1 | 5/2013 | Tajima et al. | |
| 2018/0003729 | A1 | 1/2018 | Tatsutani et al. | |
| 2019/0041412 | A1* | 2/2019 | Tsujimura | G01N 35/026 |

FOREIGN PATENT DOCUMENTS

| | | |
|---|---|---|
| JP | 11-64342 A | 3/1999 |
| JP | 2009-201368 A | 9/2009 |
| JP | 2011-242154 A | 12/2011 |
| JP | 2017-96964 A | 6/2017 |
| WO | 2016/148166 A1 | 9/2016 |

OTHER PUBLICATIONS

Extended European Search Report received in corresponding European Application No. 20843515.6 dated Jul. 14, 2023.
Japanese Office Action received in corresponding Japanese Application No. 2021-534528 dated Nov. 29, 2022.

* cited by examiner

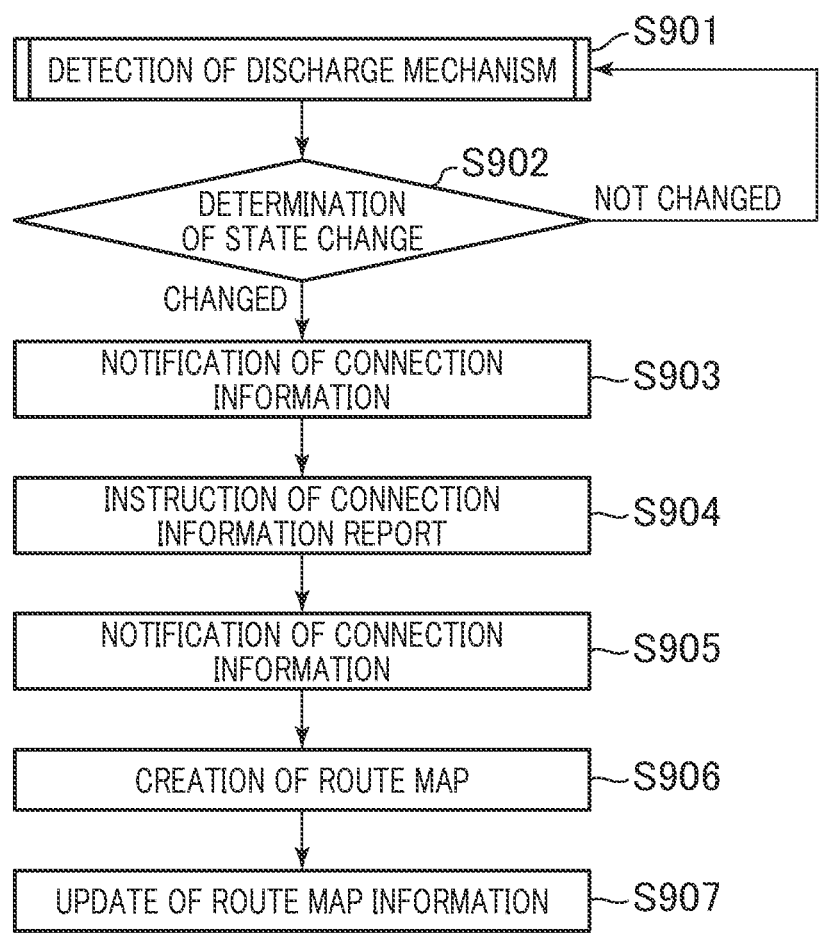

SPECIMEN INSPECTION AUTOMATION SYSTEM AND SPECIMEN INSPECTION METHOD

TECHNICAL FIELD

The present invention relates to a specimen inspection automation system and a specimen inspection method in clinical inspection, and particularly to a technique for reporting an inspection result within a fixed period of time.

Background Art

In the inspection work of specimens such as patient's blood and urine, the speeding up of work is required. In particular, as to specimens with high urgency (emergency specimens) such as pre-examination inspection specimens and emergency specimens, the time from the arrival of the specimen at the inspection room to the inspection result report (Turn Around Time, hereinafter TAT) is targeted for 20 to 30 minutes.

The specimen inspection automation system that automates the inspection work of specimens is constituted of a group of devices which perform pretreatment such as centrifugation, opening, and dispensing, a group of analyzing devices which perform analysis according to inspection items, a group of devices which perform post-processing such as classification, storage, and disposal, a conveyance device which connects between those device groups and generates a conveyance route, and the like. Further, in the specimen inspection automation system, an inspection engineer in charge of inspection work performs information communication with an information system that manages inspection requests and management of inspection results, and is capable of automatically inspecting various fed specimens according to the inspection requests. In addition, in a general specimen inspection automation system, a plurality of feed ports different in priority are provided in a feeding device into which a specimen is fed, and an emergency specimen fed into the feed port high in priority can be processed with priority over a general specimen.

However, a problem arises in that in a time zone when many inspection requests are issued, such as in the morning of the beginning of the week, a congestion phenomenon occurs in which a large number of specimens are made stagnant in the device or on the conveyance route due to insufficient processing capacity of some device, and the TAT of the entire specimen including the emergency specimen increases significantly. In order to treat with this problem, there has been disclosed in, for example, Patent Literature 1, a technique of accurately predicting the congestion state of the specimen in the system and adjusting the timing of loading and unloading the specimen and the order of loading and unloading of the specimen in each device, thereby preventing an increase in TAT of the emergency specimen.

CITATION LIST

Patent Literature

PTL 1: Japanese Unexamined Patent Application Publication No. 2011-242154

SUMMARY OF INVENTION

Technical Problem

However, in the conventional technique, when the proportion of the emergency specimens becomes higher than that of the general specimens by excessively feeding the specimen from the feed port high in the degree of urgency, the number of specimens having the same priority increases, thus causing a risk that the effect by adjusting the timing of loading and unloading the specimen and the order of loading and unloading in each device will be impaired. As a result, a congestion phenomenon occurs in which a large number of specimens are made stagnant in the device or on the conveyance route. It is expected that the TAT of the entire specimen including the emergency specimen will be prolonged, that is, this will lead to delays in reporting results. Therefore, there was room for improvement. Further, when a medical doctor suddenly asks for a result report, the doctor can only tell the estimated time when the result can be reported, and only wait until the processing in the specimen inspection automation system is completed.

An object of the present invention is to provide a specimen inspection automation system and a specimen inspection method for solving the above problems and reporting results without prolonging TAT.

Solution to Problem

In order to achieve the above object, in the present invention, there is provided a specimen inspection automation system including an instruction reception unit which accepts a discharge instruction of a specimen, a discharge planning unit which determines whether or not discharge of the specimen instructed on the basis of the discharge instruction is necessary, a discharge specimen storage device which stores the specimen planned to be discharged by the discharge planning unit, a discharge instruction unit which creates a discharge destination of the specimen stored in the discharge specimen storage device and a conveyance route to the discharge destination, and a discharge mechanism unit for the specimen instructed to be discharged by the discharge instruction unit.

Further, in order to achieve the above object, in the present invention, there is provided a specimen inspection method of a specimen inspection automation system, including accepting a discharge instruction of a specimen, determining whether or not discharge of the specimen instructed on the basis of the discharge instruction is necessary, creating a discharge destination of the specimen determined to be discharged and a conveyance route to the discharge destination, and discharging the specimen in accordance with the discharge destination and the discharge route to the discharge destination.

Advantageous Effects of Invention

According to the present invention, a result report or a report delay within a predetermined time can be minimized by providing two means of continuing automatic processing in a system or switching from discharging from the system to manual processing by an operator.

BRIEF DESCRIPTION OF DRAWINGS

FIG. 9 is a route map update processing flowchart of the specimen inspection automation system according to the third embodiment.

DESCRIPTION OF EMBODIMENTS

Hereinafter, various embodiments of the present invention will be described in detail with reference to the drawings. The following embodiments are typical embodiments relating to the realization of the basic concept in the present invention, but the present invention is not limited thereto.

First Embodiment

The first embodiment is an embodiment of a specimen inspection automation system which promptly discharges a specimen to a discharge mechanism unit previously attached to any of processing devices constituting the specimen inspection automation system according to an instruction from a clinical inspection system or an internal device control terminal. That is, the first embodiment is an embodiment of a specimen inspection automation system including an instruction reception unit which accepts a discharge instruction of a specimen, a discharge planning unit which determines whether or not discharge of the specimen instructed on the basis of the discharge instruction is necessary, a discharge specimen storage device which stores the specimen planned to be discharged by the discharge planning unit, a discharge instruction unit which creates a discharge destination of the specimen stored in the discharge specimen storage device and a conveyance route to the discharge destination, and a discharge mechanism unit for the specimen instructed to be discharged by the discharge instruction unit, and a specimen inspection method thereof.
<System Configuration>

Figure 1:
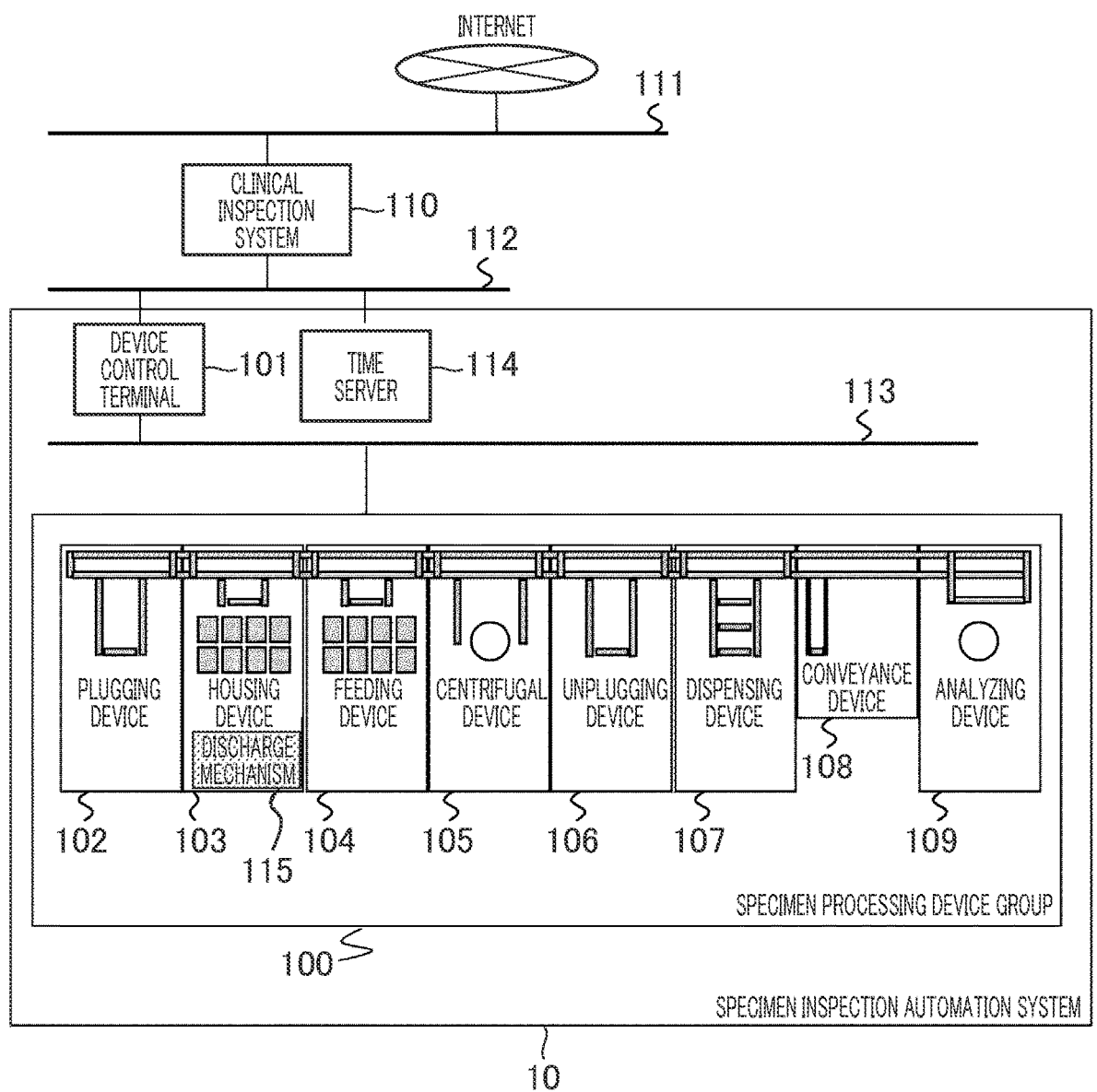
FIG. 1 is a configuration diagram for showing an example of a specimen inspection automation system according to a first embodiment.

FIG. 1 is a diagram showing a configuration example of the specimen inspection automation system according to the first embodiment. As shown in FIG. 1, the specimen inspection automation system 10 includes a specimen processing device group 100 and a device control terminal 101 which controls each of processing devices 102 to 109. The device control terminal 101 can be realized by causing a central processing unit (CPU) of a normal personal computer (PC) to execute a desired control program.

The specimen processing device group 100 is connected to be communicable via a device information network 113 such as a local area network (Local Area Network: hereinafter referred to as LAN). A clinical inspection system 110 is similarly connected to be communicable via a clinical inspection unit information network 112 such as LAN. Further, the clinical inspection system 110 is connected to other systems in the hospital such as an electronic medical record system via an information network in hospital 111. A time server 114 for synchronizing the time between the clinical inspection system 110 and the device control terminal 101 is installed on the clinical inspection unit information network 112.

Respective processing devices of the specimen processing device group 100 consist of a feeding device 104 being pretreatment, a centrifugal device 105, an unplugging device 106, a dispensing device 107, 108 being a conveyance device, an analyzing device 109, a plugging device 102 being post-treatment, and a housing device 103, and are installed in such an arrangement as shown in FIG. 1. Each of these devices is provided internally with a conveyance route for conveying each specimen. Connecting the conveyance routes of the adjacent devices to each other enables transfer between the devices. Incidentally, mainly in order to improve the workability of an inspection engineer, the feeding device 104 for the specimen and the housing device 103 for the specimen are arranged adjacent to each other.

A specimen to be inspected, which is placed in a test tube or the like, is fed from the feeding device 104 having two feed ports for an emergency specimen and a general specimen. A specimen identifier is read from a specimen barcode attached to the test tube fed by the feeding device 104. The device control terminal 101 inquires the clinical inspection system 110 of an inspection request item. The clinical inspection system 110 transmits the inspection request item of the inquired specimen identifier to the device control terminal 101.

The specimen fed into the feeding device 101 is conveyed according to this inspection request item and processed by each processing device to be described later. The emergency specimen is sent to the centrifugal processing device 105 with priority over the general specimen. When there is no emergency specimen, sending to the centrifugal processing device 105 is performed in the order in which the general specimen is fed. When centrifugal processing is not required, the specimen discharged into the centrifugal processing device 105 is discharged to the next unplugging device 106 as it is. Further, when the centrifugal processing is required, dozens of specimens are collected, centrifuged, and then discharged to the unplugging device 106.

From the specimens that have been centrifuged at the same time, the emergency specimens are discharged to the unplugging processing device with priority over the general specimens. The specimen fed from the centrifugal device 105 to the unplugging device 106 is subjected to unplugging processing in fed order, and then discharged to the dispensing device 107. In the dispensing device 107, child specimens are generated by a required number by dispensing a predetermined amount according to each inspection request item from each fed specimen as a parent specimen. After that, the generated child specimen and parent specimen are conveyed from the dispensing device 107 to the analyzing device 109 via the conveyance device 108. When analysis is not required in the analyzing device 109, they are discharged to the plugging device 102. Further, the specimen for which the analysis processing has been completed is also discharged to the plugging device 102 via the conveyance device 108. The specimen fed to the plugging device 102 is subjected to plugging processing in fed order, and is recovered or stored in the housing device 103.

Incidentally, in the system configuration of the present embodiment, only one housing device 103 is provided adjacent only to the feeding device 104, but the specimen for which the analysis processing has been completed may be recovered or stored in the second feeding device connected to the conveyance device 108 without returning to the pretreatment device. Further, in the configuration of FIG. 1, the discharge mechanism 115 is attached only to the housing device 103, but may be attached to other devices.

<Functional Configuration>

Figure 2:
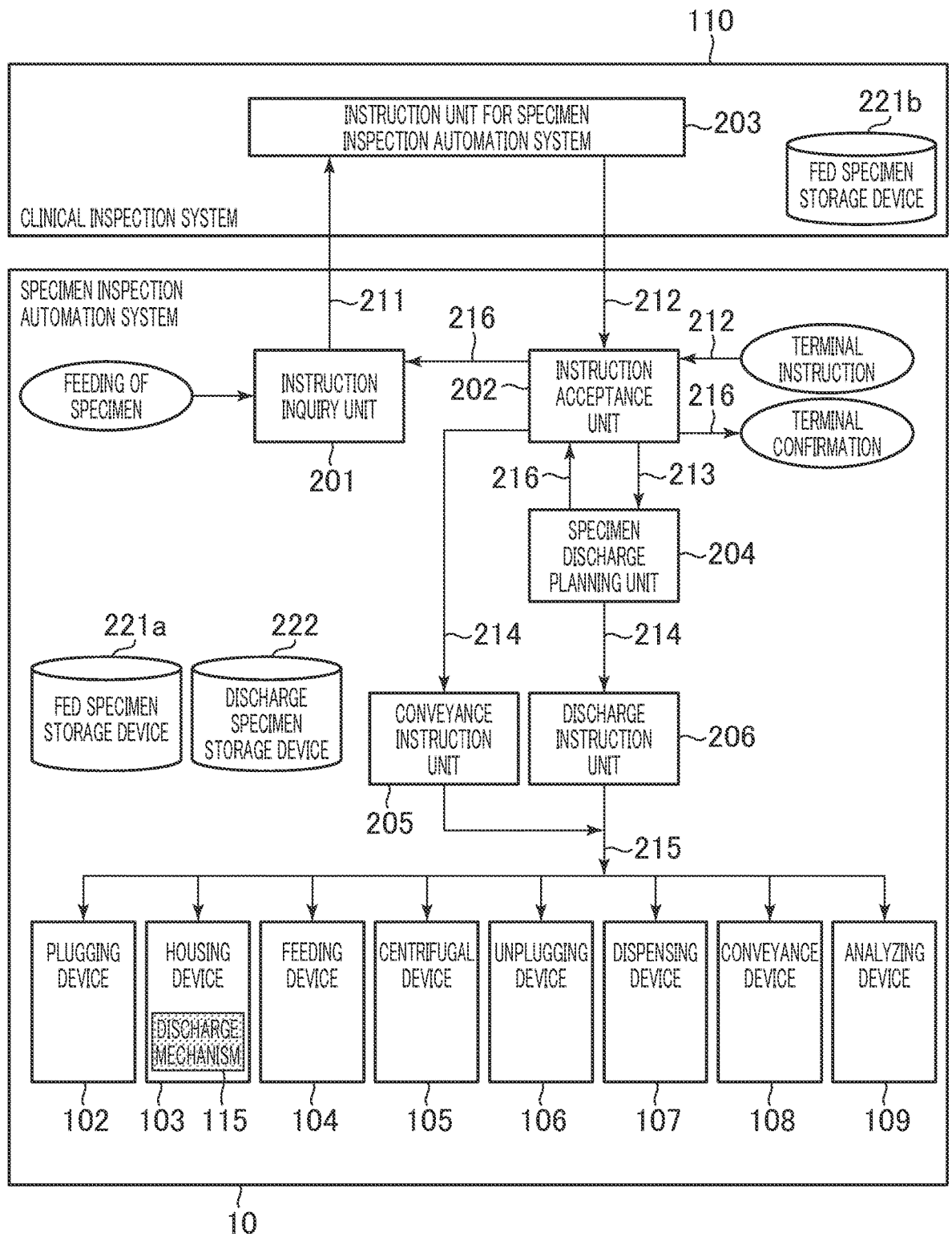
FIG. 2 is a function diagram of the specimen inspection automation system according to the first embodiment.

FIG. 2 is a diagram for describing a functional configuration in the specimen inspection automation system 10 according to the first embodiment, for promptly discharging the specimen already fed into the specimen inspection automation system 10 to the discharge mechanism 115 by the instruction from the clinical inspection system 110 or the terminal instruction from the device control terminal 101 and making switching to the manual processing by the operator. Incidentally, in the present specification, the discharge instruction of the specimen sent from an external system communicable with the specimen inspection automation system such as the clinical inspection system 110 with respect to the specimen inspection automation system 10 may be referred to as a direct discharge instruction or a direct instruction. On the other hand, the terminal instruction from the device control terminal 101 may be referred to as an indirect discharge instruction or an indirect instruction.

The specimen inspection automation system 10 stores specimen information about the specimen fed into the corresponding automation system in a fed specimen storage device 221a, and sends inquiry information 211 to the clinical inspection system 110 in order to confirm each inspection item requested from an instruction inquiry unit 201 for the specimen. The clinical inspection system 110 stores the specimen information included in the inquiry information 211 in a fed specimen storage device 221b and sends instruction information 212 not including the discharge instruction to an instruction acceptance unit 212 of the automation system 10 in order to send the inspection item.

When the clinical inspection system 110 gives a discharge instruction being a direct instruction to the fed specimen, the corresponding specimen stored in the fed specimen storage device 221b is selected, and the instruction information 212 including the discharge instruction is sent to the instruction acceptance unit 202 of the specimen inspection automation system 10. Further, when a discharge instruction being an indirect instruction is given from the device control terminal 101 of the specimen inspection automation system 10, the instruction information 212 is sent to the instruction acceptance unit 202.

The specimen discharge planning unit 204 determines whether or not the specimen given the discharge instruction is required to be discharged, and acquires and confirms a processing completion scheduled time and a processing status, which are processing statuses in the specimen related to discharge request information 213, and sends discharge confirmation information 216 indicative of confirmation of necessity of the discharge to an instruction source. As a result of confirming to a request source, the specimen information determined to be required to be discharged is registered in the discharge specimen storage device 222. Then, route creation request information 214 is sent to a discharge instruction unit 206.

The discharge instruction unit 206 creates a conveyance route to the device having the discharge mechanism 115, based on the route creation request information 214. When there is no discharge instruction in the instruction information 212, the conveyance instruction unit 205 creates a conveyance route according to the request item, based on the route creation request information 214. In the specimen inspection automation system 10, the conveyance route created by the conveyance instruction unit 205 or the discharge instruction unit 206 is sent to each specimen processing device as conveyance route information 215.

<Outline of Processing>

Figure 3:
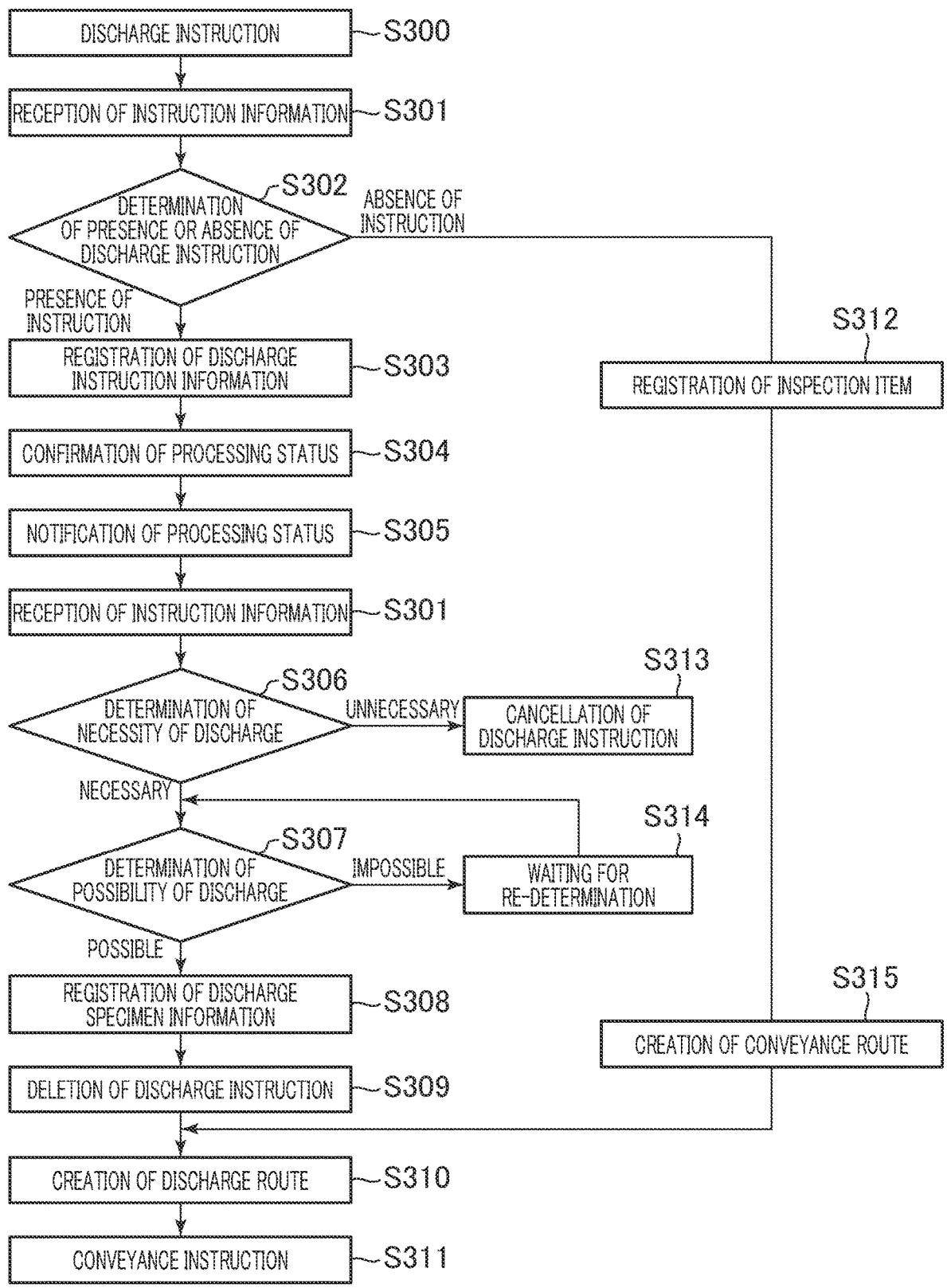
FIG. 3 is a processing flowchart of the specimen inspection automation system and a specimen inspection method according to the first embodiment.

FIG. 3 is a diagram showing an example of a processing flow of the specimen inspection automation system 10 according to the first embodiment. The instruction acceptance unit 202 receives the instruction information from the clinical inspection system 110 or the device control terminal 101 (S301), and determines whether the discharge instruction (S300) is included (S302). When the discharge instruction is not included in the instruction information 212, each inspection item possessed by the instruction information 212 is registered in the fed specimen storage device 221a (S312). In conveyance route creation processing (S315), a specimen conveyance route according to the inspection item is created, and a conveyance instruction is sent to each specimen processing device (S311).

When the discharge instruction is included in the instruction information 212, the instruction information 212 is registered in the fed specimen storage device 221a (S303), and the processing status of the corresponding specimen is confirmed (S304). In this confirmation of the processing status, the processed item, the unprocessed item, the processing status in any device such as being in conveyance, waiting for analysis, or being in analysis, and the processing completion scheduled time are acquired. After acquiring the processing status, the processing status is notified to the discharge instruction source (S305), and confirmation of whether or not the discharge is necessary is requested.

After receiving the confirmation result from the discharge instruction source (S301), a discharge necessity determination is performed (S306). When the confirmation result from the discharge instruction source indicates discharge unnecessity, the discharge instruction information of the corresponding specimen registered in the fed specimen storage device 221a is canceled (S313). When the confirmation result from the discharge instruction indicates discharge necessity, it is determined whether or not the discharge of the corresponding specimen is possible (S307). When it is possible to discharge it, the corresponding specimen is registered in the discharge specimen storage device 222 (S308), and the instruction to discharge the corresponding specimen is deleted from the fed specimen storage device 221a (S309). In discharge route creation processing (S310), route information for conveying the specimen registered in the discharge specimen storage device 222 to the discharge mechanism 115 is created, and a conveyance instruction is sent to each specimen processing device (S311). In the discharge possibility determination (S307), when the discharge is not possible, a re-determination wait is performed (S314), and the determination processing (S307) is repeated until the discharge becomes possible.

According to the specimen inspection automation system of the first embodiment described in detail above, it is possible to promptly discharge the specimen to the discharge mechanism previously attached to any of the devices constituting the specimen inspection automation system, based on the discharge instruction from the clinical inspection system or the internal device control terminal.

Second Embodiment

In a second embodiment, description will be made as to an embodiment of a specimen inspection automation system which specifies a specimen whose prescribed time (TAT) up to an inspection result report is only a few left, and promptly discharges the specimen to a discharge mechanism unit previously attached to any of devices constituting the specimen inspection automation system.

<System Configuration>

Since the second embodiment is also the same in configuration diagram as the specimen inspection automation system of the first embodiment shown in FIG. 1, the description of the system configuration will be omitted.

<Functional Configuration>

Figure 4:
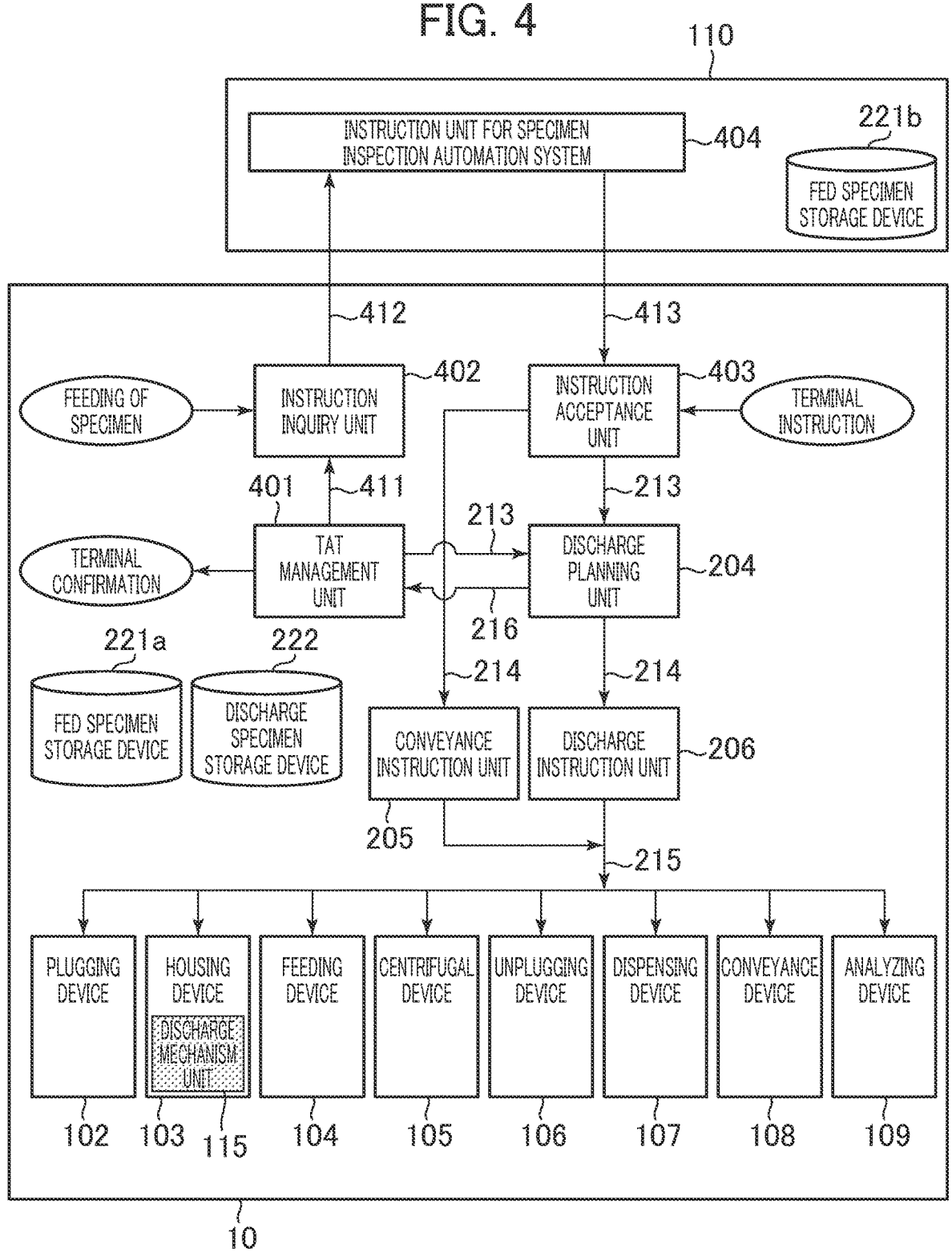
FIG. 4 is a function diagram of a specimen inspection automation system according to a second embodiment.

FIG. 4 describes in the specimen inspection automation system 10 according to the second embodiment, a functional configuration for specifying a specimen whose TAT is short, and discharging it from the automation system 10. In the functional configuration of FIG. 4, a TAT management unit 401 is added in addition to the functional configuration of the first embodiment shown in FIG. 2.

In the specimen inspection automation system 10, specimen information of the specimen fed into the system is stored in a fed specimen storage device 421a, and in order to confirm each inspection item of the corresponding specimen, an instruction inquiry unit 402 sends inquiry information 412 to an instruction unit 404 to the specimen inspection automation system of a clinical inspection system 110. The inquiry information 412 at the time of confirmation of the inspection item does not include discharge confirmation information 216. The clinical inspection system 110 stores the inspection information included in the inquiry information 412 in a fed specimen storage device 421b, and sends instruction information 413 from the instruction unit 404 to the specimen inspection automation system to an instruction acceptance unit 403 of the automation system 10. This instruction information 413 includes inspection items and TAT information, and the instruction acceptance unit 403 registers these information in the fed specimen storage device 421a.

The TAT information includes at least a time until the inspection result is reported (TAT) and a timeout time. The registration of the TAT information may be performed from a device control terminal 101 of the specimen inspection automation system 10. Further, the registration of the TAT information may be performed in units of specimens, inspection items, or types of specimens. Further, the TAT information registered in the fed specimen storage device 421a may be changed during the specimen processing.

The start of TAT countdown may be performed at the time of specimen reception, but in the present embodiment, it is assumed to be started when the TAT information included in the instruction information 413 from the instruction unit 404 to the specimen inspection automation system is registered in the fed specimen storage device 421a.

The TAT management unit 401 monitors the TAT information registered in the fed specimen storage device 421a. As described above, the TAT countdown may be performed at the time of specimen reception, but in the present embodiment, it is assumed to be started when the TAT information included in the instruction information 413 from the instruction unit 404 to the specimen inspection automation system is registered in the fed specimen storage device 421a.

When the TAT management unit 401 detects a specimen whose TAT remaining time becomes short, that is, the time until the inspection result is reported is imminent, it sends discharge request information 213 to a discharge planning unit 204 and confirms the processing status of the specimen. Inclusive of the specimen processing status, the TAT management unit 401 makes an inquiry to the device control terminal 101 of the specimen inspection automation system 10 or the clinical inspection system 110 as to whether or not the corresponding specimen needs to be discharged. The inquiry about the necessity of its discharge to the clinical inspection system 110 is made via the instruction inquiry unit 402. As shown in FIG. 4, the instruction inquiry unit 402 sends the inquiry information 412 to the instruction unit 404 to the specimen inspection automation system of the clinical inspection system 110.

The inquiry information 412 includes the discharge confirmation information 216. The instruction unit 404 to the specimen inspection automation system sends instruction information 413 including a discharge confirmation result to the instruction acceptance unit 403. The instruction information 413 does not include inspection items and TAT information. The instruction acceptance unit 403 that has accepted the instruction information 413 sends the discharge request information 213 to the discharge planning unit 204 to make a discharge plan. The discharge planning unit 204 registers the specimen determined to be required to be discharged in the specimen discharge storage device 222, creates a conveyance route to a discharge mechanism 115 by a discharge instruction unit 206, and sends conveyance route information 215 to each specimen processing device.

<Outline of Processing>

Figure 5:
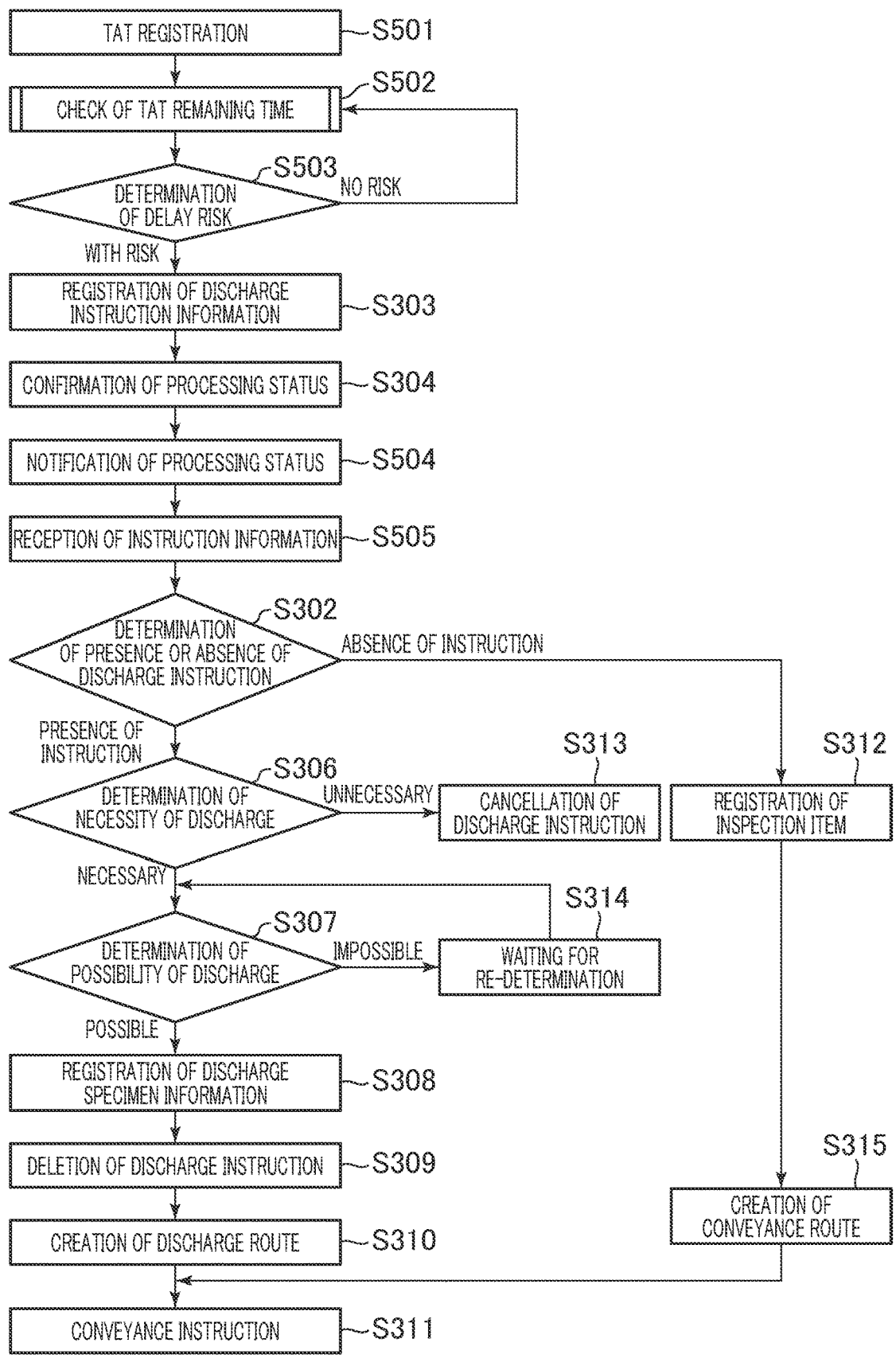
FIG. 5 is a processing flowchart of the specimen inspection automation system and a specimen inspection method according to the second embodiment.

FIG. 5 is a processing flow according to the present embodiment. TAT information (TAT and timeout time) is registered from the clinical inspection system 110 or the device control terminal 101 of the specimen inspection automation system 10 (S501), and the TAT countdown is started. A check is made if the remaining time of TAT is the same as the timeout time (S502). When the remaining time of TAT is larger than the timeout time, it is determined that there is no risk of a delay in reporting the result, and the remaining time of TAT is checked again at the next cycle (S502).

When the remaining time of TAT is equal to or smaller than the timeout time, it is determined that there is a risk of a delay in reporting the result, and the discharge instruction information is registered for the corresponding specimen registered in the fed specimen storage device 421a (S303). After confirming the processing information of the corresponding specimen (S304), the processing status is notified to the clinical inspection system 110 or the device control terminal 101 of the specimen inspection automation system 10 as an inquiry as to whether or not the specimen needs to be discharged (S504).

Upon receiving the instruction information as the result of the inquiry as to whether or not the specimen needs to be discharged (S505, S302), the discharge determination of the corresponding specimen is carried out (S306, S307). As a result of the determination, when it is determined that the discharge is unnecessary, the discharge instruction of the corresponding specimen registered in the fed specimen storage device 221a is canceled (S313). On the other hand, when it is determined that the discharge is necessary, the corresponding specimen information is registered in the discharge specimen storage device 222 (S308), and the discharge instruction of the corresponding specimen registered in the fed specimen storage device 221a is deleted (S309). Incidentally, since the determination of presence/absence of the discharge instruction (S302), the registration of the inspection items (S312), and the creation of the conveyance route (S315) are the same as those in the first embodiment, the description thereof will be omitted.

In the discharge route creation (S310), a discharge route for discharging the specimen registered in the discharge specimen storage device 222 to the discharge mechanism 115 is created. The conveyance route information 215 is sent to each specimen processing device. On the other hand, in the discharge possibility determination (S307), when the discharge is not possible, a re-determination wait (S314) is performed, and the discharge possibility determination (S307) is repeated until the discharge becomes possible.

Thus, in the specimen inspection automation system of the present embodiment, it is possible to specify the specimen whose TAT becomes only a few left, promptly discharge the specimen to the discharge mechanism unit previously attached to any of the devices constituting the specimen inspection automation system, and perform switching to manual processing by the operator.

Third Embodiment

In a third embodiment, description will be made as to an embodiment in which according to an instruction to discharge a specimen in which the first and second embodiments are combined, the specimen is discharged to a discharge mechanism that can be freely attached to and detached from a device constituting a specimen inspection automation system.
<System Configuration>

Figure 6:
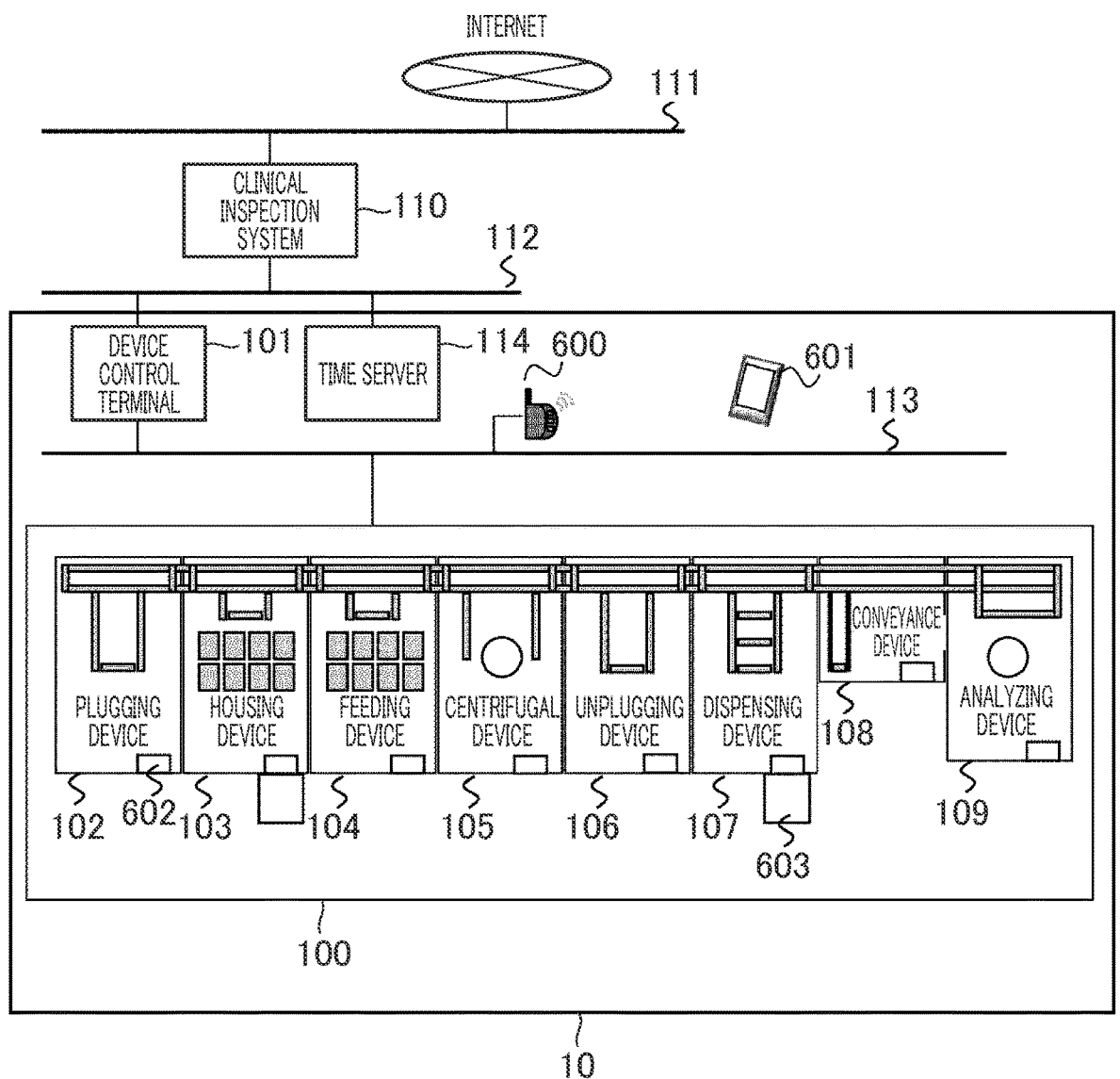
FIG. 6 is a configuration diagram for showing an example of a specimen inspection automation system according to a third embodiment.

FIG. 6 is a diagram showing a configuration of a specimen inspection automation system according to the third embodiment. As shown in FIG. 6, in addition to the configuration of the specimen inspection automation system 10 according to the first and second embodiments shown in FIG. 1, there is provided an operation terminal tablet 601 that enables the operation of the specimen inspection automation system even at a place away from a device control terminal 101. The operation terminal tablet 601 communicates with the device control terminal 101 via a wireless router 600 connected to a device information network 113. Further, each of specimen processing devices 102, 103, 104, 105, 106, 107, 108, and 109 has an interface (I/F) 602 which detects the presence/absence of connection with the specimen discharge mechanism. The specimen discharge mechanism 603 can be freely attached to and detached from the interface (I/F) 602. That is, the specimen discharge mechanism, which is a discharge mechanism unit, can be attached to and detached from a plurality of devices constituting the specimen inspection automation system, and each of the plurality of devices has an interface which detects the attached state of the discharge mechanism unit.
<Functional Configuration>

Figure 7:
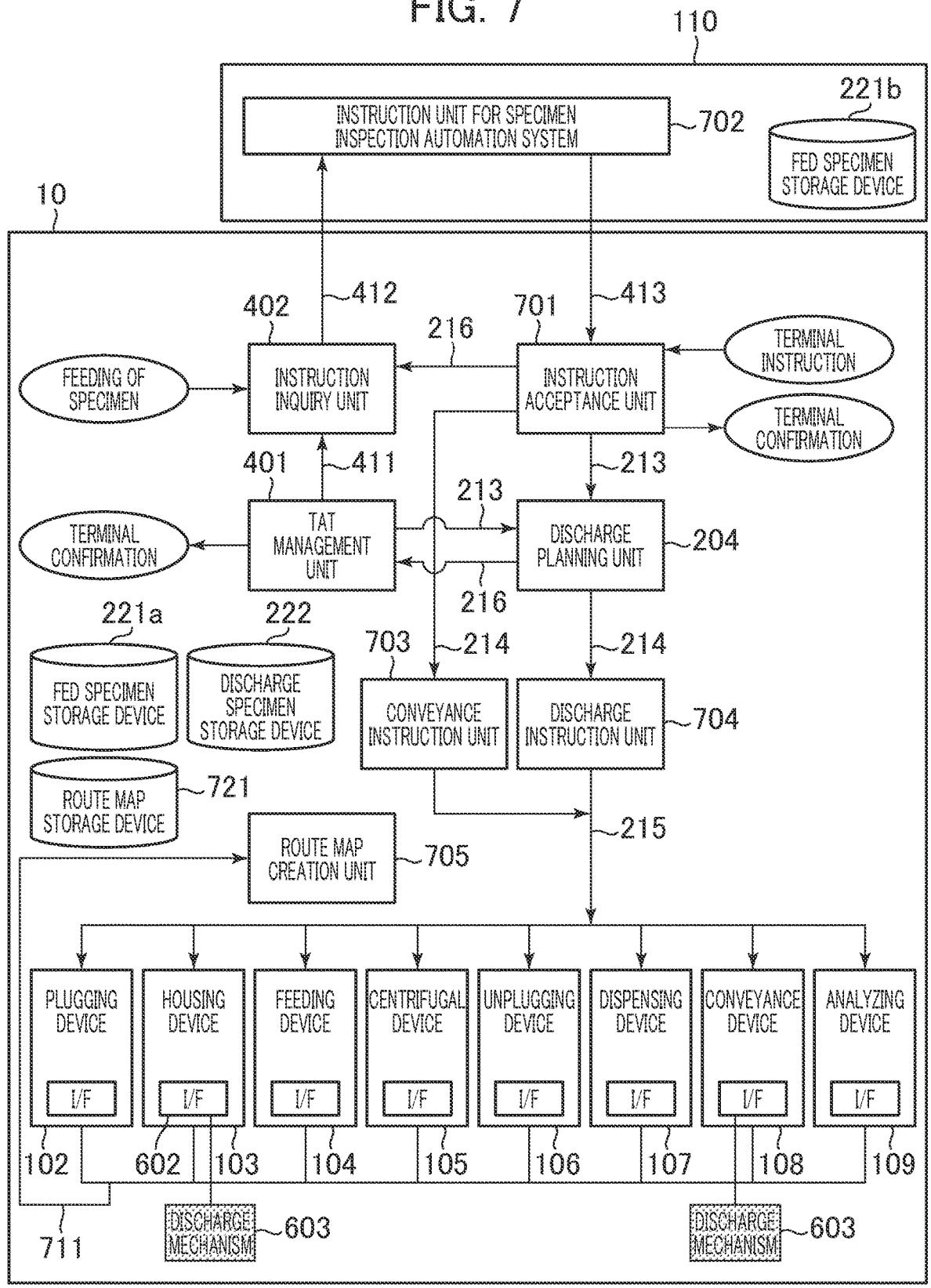
FIG. 7 is a function diagram of the specimen inspection automation system according to the third embodiment.

FIG. 7 is a diagram for describing a functional configuration for discharging the specimen already fed into the automation system 10 out of the system by the combination of the discharge instructions described in the first and second embodiments in the specimen inspection automation system 10 according to the third embodiment.

The discharge of the specimen is performed on the basis of the discharge instruction from the clinical specimen system 110 or the device control terminal 101 of the specimen inspection automation system 10, which has been described in the first embodiment, and the discharge instruction from the clinical inspection system 110 or the device control terminal 101 of the specimen inspection automation system 10 with respect to the inquiry as to whether or not the specimen needs to be discharged from the TAT management unit 401 described in the second embodiment. Therefore, an instruction unit 702 for the specimen inspection automation system must be able to handle each of the direct discharge instruction from the clinical inspection system 110 and the indirect discharge instruction after receiving the inquiry information 412 including the discharge confirmation from the instruction inquiry unit 402. In other words, when the discharge instruction to be handled is a direct instruction sent from an external system that can communicate with the specimen inspection automation system, the instruction inquiry unit that sends the discharge inquiry information to the external system communicable with the specimen inspection automation system includes a case where the discharge instruction is the indirect instruction sent from the external system in response to the discharge inquiry information sent to the external system.

Next, the creation of a discharge route for discharging the specimen to the discharge mechanism 603 that can be freely attached and detached will be described. As described above, each specimen processing device 102, 103, 104, 105, 106, 107, 108, 109 has the interface (I/F) 602 which detects the presence/absence of connection with the discharge mechanism that can be freely attached and detached. When the discharge mechanism 603 is attached or detached, connection information 711 in the specimen processing device including the discharge mechanism 603 is sent to a route map creation unit 705. The route map creation unit 705 creates a route map based on the connection information 711 and registers it in a route map storage device 721. A conveyance instruction unit 703 and a discharge instruction unit 704 refer to the route map managed by the route map storage device 721 and create a conveyance route for each specimen registered in the fed specimen storage device 221a.

That is, the specimen inspection automation system of the present embodiment includes the route map creation unit that updates the conveyance route map of the specimen inspection automation system each time the connection state of the discharge mechanism unit is switched, and the route map storage device that stores the conveyance route map created by the route map creation unit. The discharge instruction unit can acquire the latest conveyance route map from the route map storage device and create the conveyance route.
<Outline of Processing>

Figure 8:
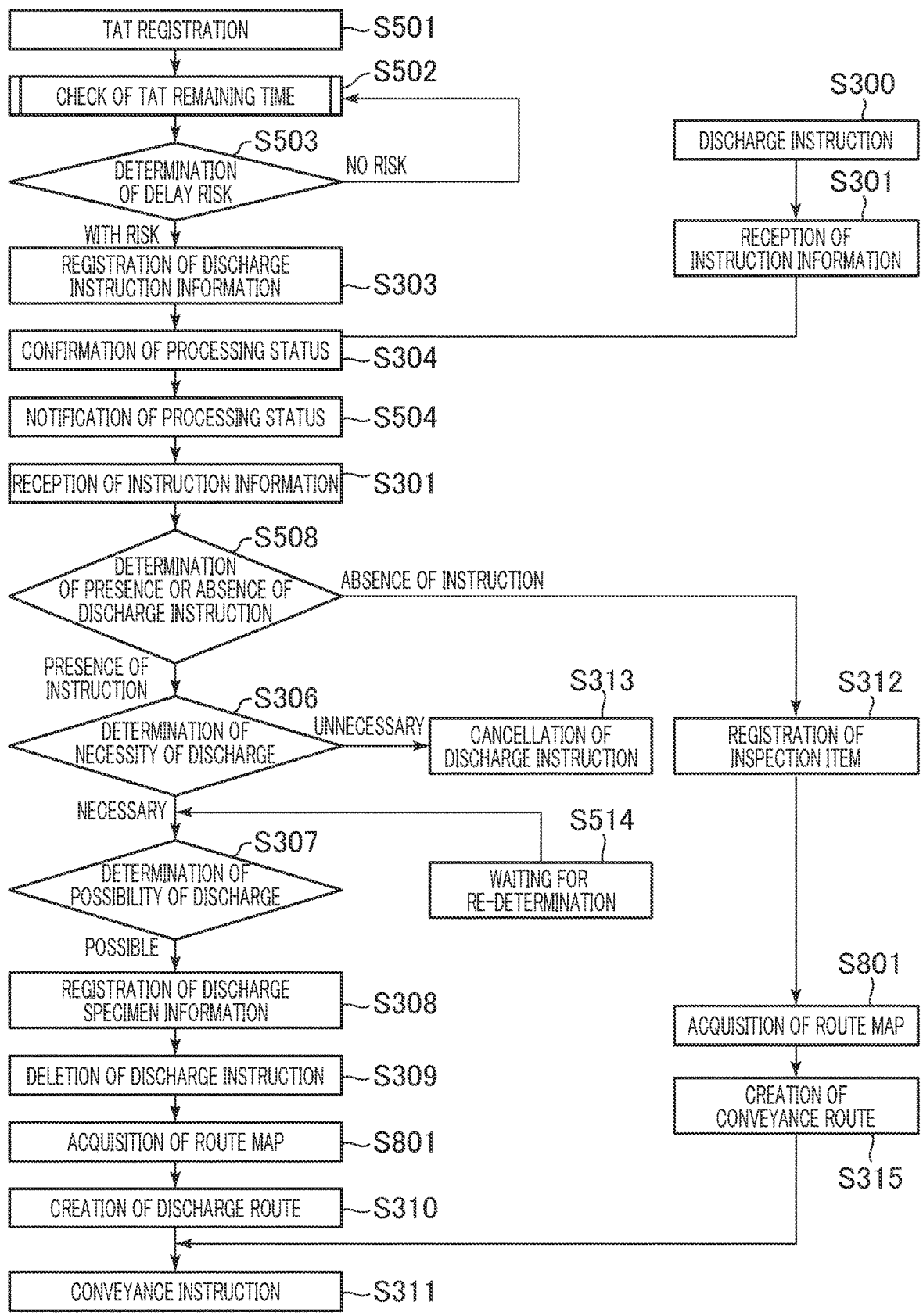
FIG. 8 is a processing flowchart of the specimen inspection automation system and a specimen inspection method according to the third embodiment.

FIG. 8 is a processing flow according to the present embodiment. As shown in FIG. 8, the processing flow of the third embodiment is a combination of the processing flow of FIG. 3 described in the first embodiment and the processing flow of FIG. 5 described in the second embodiment. Route map acquisition processing (S801) for acquiring a route map from the route map storage device 721 is added before the conveyance route creation (S315) and the discharge route creation (S310).

FIG. 9 is a processing flow for registering the route map in the route map storage device 721. In each of the specimen processing devices 102, 103, 104, 105, 106, 107, 108, and 109, the connection state of the discharge mechanism 603 is confirmed (S901), and the presence or absence of a state change is determined (S902). The specimen processing device having detected the change in the connection state notifies the device control terminal 101 of connection information (S903). The device control terminal 101 gives a connection information report instruction (S904), and each specimen processing device notifies the connection information 711 (S905). The device control terminal 101 creates a route map based on the connection information 711 (S906), and updates the route map registered in the route map storage device 721 (S907).

According to the present embodiment, in accordance with the various discharge instructions, it is possible to discharge the specimen to the discharge mechanism capable of being freely attached to and detached from the device constituting the specimen inspection automation system, and switching to manual processing by the operator.

Incidentally, the present invention is not limited to the above-mentioned embodiments and includes various modifications. For example, the above-mentioned embodiments have been described in detail for a better understanding of the present invention and are not necessarily limited to those having all the configurations of the description.

Further, as for each of the above-described configurations, functions, device control terminals, etc., the example of causing the PC to execute the control program that realizes a part or all of them has been described, but it is needless to say that the part or all of them may be realized in hardware by designing by an integrated circuit, for example, etc. That is, all or part of the functions of the device control terminal may be realized by an integrated circuit such as an ASIC (Application Specific Integrated Circuit) or an FPGA (Field Programmable Gate Array), etc. instead of the program.

LIST OF REFERENCE SIGNS 10 specimen inspection automation system
100 specimen processing device group
101 specimen inspection automation system control terminal
102 plugging device
103 housing device
104 feeding device
105 centrifugal device
106 unplugging device
107 dispensing device
108 conveyance device
109 analyzing device
110 clinical inspection system
111 information network in hospital
112 clinical inspection unit information network
113 device information network
114 time server
115, 603 specimen discharge mechanism
201, 402 instruction inquiry unit
202, 403, 701 instruction acceptance unit
203, 404, 702 instruction unit for specimen inspection automation system
204 discharge planning unit
205, 703 conveyance instruction unit
206, 704 discharge instruction unit
211, 412 inquiry information
212 instruction information
213 discharge request information
214 route creation request information
215 conveyance route information
216 specimen discharge confirmation information
221a, 221b fed specimen storage device
222 discharge specimen storage device
401 TAT management unit
411 report delay risk information
600 wireless router
601 operation terminal tablet
602 interface (I/F)
705 route map creation unit
711 connection information of specimen processing device and discharge mechanism unit
721 route map storage device

What is claimed is:

1. A specimen inspection automation system comprising:
an instruction reception unit that accepts a discharge instruction of a specimen;
a discharge planning unit that determines whether discharge of the specimen instructed on the basis of the discharge instruction is necessary;
a discharge specimen storage device that stores the specimen planned to be discharged by the discharge planning unit;
a discharge instruction unit that creates a discharge destination of the specimen stored in the discharge specimen storage device and a conveyance route to the discharge destination;
a discharge mechanism unit for the specimen instructed to be discharged by the discharge instruction unit; and
an instruction inquiry unit that sends a discharge inquiry information to an external system that communicates with the specimen inspection automation system,
wherein the discharge instruction is an indirect instruction sent from the external system in accordance with the discharge inquiry information sent from the instruction inquiry unit to the external system.

2. The specimen inspection automation system according to claim 1,
wherein a TAT management unit that manages a turn around time (hereinafter, referred to as TAT) before an inspection result report in which the specimen is defined is provided, and
wherein in the case where the TAT is equal to or smaller than a time-out time, the TAT management unit instructs the instruction inquiry unit to send the discharge inquiry information to the external system.

3. The specimen inspection automation system according to claim 1,
wherein the discharge planning unit determines whether discharge of the specimen instructed to be discharged is necessary and acquires a processing status of the specimen instructed to be discharged.

4. The specimen inspection automation system according to claim 1,
wherein the discharge mechanism unit is attached to and removed from plural devices configuring the specimen inspection automation system, and
wherein the plural devices include interfaces that detect an attachment state of the discharge mechanism unit.

5. The specimen inspection automation system according to claim 4, further comprising:
a route map creation unit that updates a conveyance route map of the specimen inspection automation system every time a connection state of the discharge mechanism unit is switched; and
a route map storage device that stores the conveyance route map created by the route map creation unit.

6. The specimen inspection automation system according to claim 5,
wherein the discharge instruction unit acquires the latest conveyance route map from the route map storage device to create a conveyance route.

7. A specimen inspection method of a specimen inspection automation system, the method comprising:
accepting a discharge instruction of a specimen;
determining whether discharge of the specimen instructed on the basis of the discharge instruction is necessary;
creating a discharge destination of the specimen determined to be discharged and a conveyance route to the discharge destination are;
discharging the specimen in accordance with the discharge destination and the discharge route to the discharge destination, wherein the discharge instruction is an indirect instruction sent from the external system in accordance with discharge inquiry information sent to an external system that communicates with the specimen inspection automation system.

8. The specimen inspection method according to claim 7, wherein in the case where a TAT of the specimen is equal to or smaller than a time-out time, the discharge inquiry information is sent to the external system.

9. The specimen inspection method according to claim 7, wherein it is determined whether or not discharge of the specimen instructed to be discharged is necessary and a processing status of the specimen instructed to be discharged is acquired.

10. The specimen inspection method according to claim 7, wherein a discharge mechanism unit for the specimen can be attached to and removed from plural devices configuring the specimen inspection automation system in the specimen inspection automation system.

11. The specimen inspection method according to claim 10, wherein a conveyance route map of the specimen inspection automation system is updated every time a connection state of the discharge mechanism unit is switched and a conveyance route is created on the basis of the updated latest conveyance route map.

\* \* \* \* \*